Figure 7:
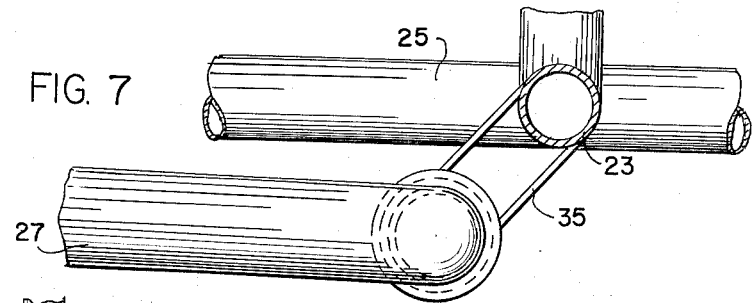

Sept. 7, 1965  I. B. PARR ETAL  3,204,606
ARTICULATED LIVESTOCK PANELS
Filed Nov. 8, 1963
3 Sheets-Sheet 1
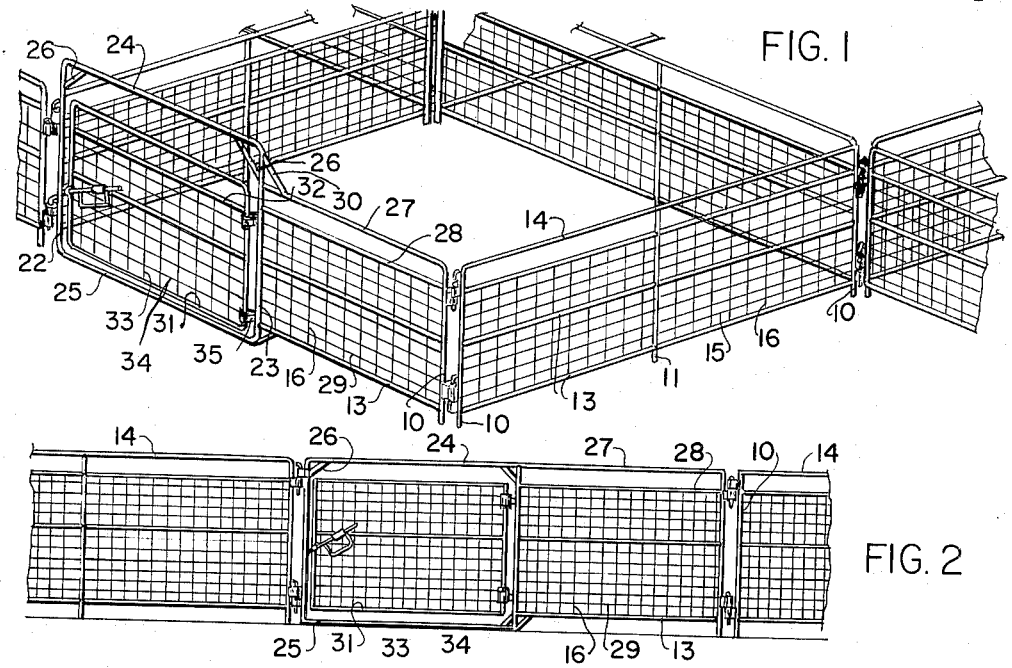
FIG. 1
FIG. 2
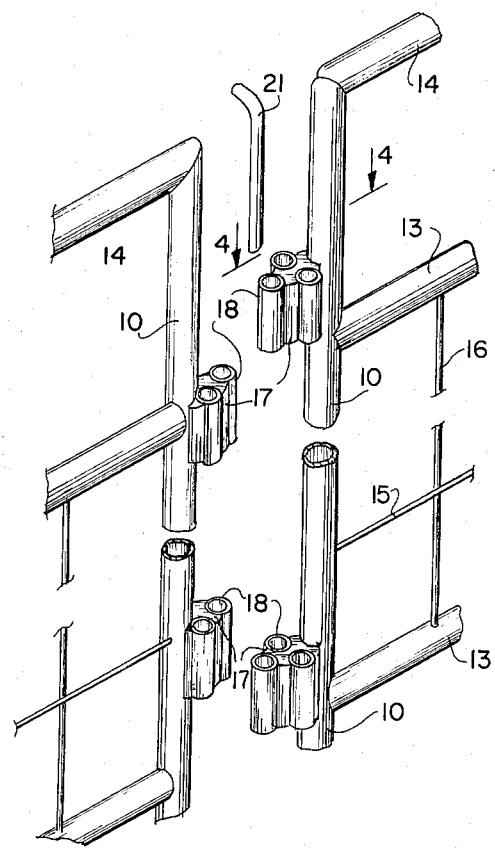
FIG. 3
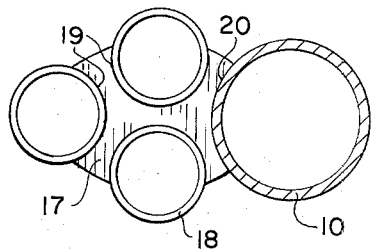
FIG. 4
INVENTORS
IRA B. PARR
BRUCE PARR
BY
ATTORNEYS Sept. 7, 1965

I. B. PARR ETAL 3,204,606

ARTICULATED LIVESTOCK PANELS

Filed Nov. 8, 1963

3 Sheets-Sheet 2

INVENTOR
IRA B. PARR
BRUCE PARR

BY

ATTORNEY

Sept. 7, 1965    I. B. PARR ETAL    3,204,606
ARTICULATED LIVESTOCK PANELS
Filed Nov. 8, 1963    3 Sheets-Sheet 3
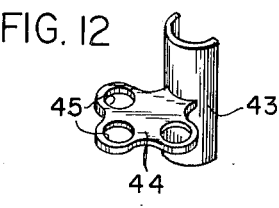
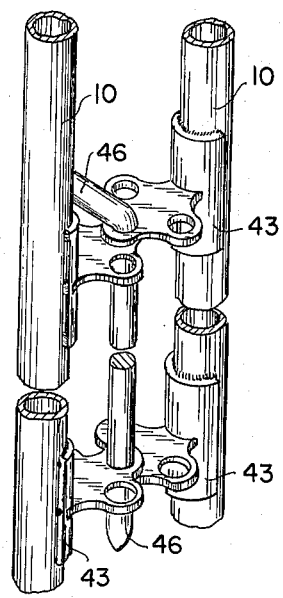
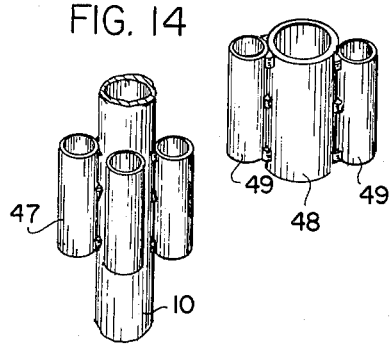
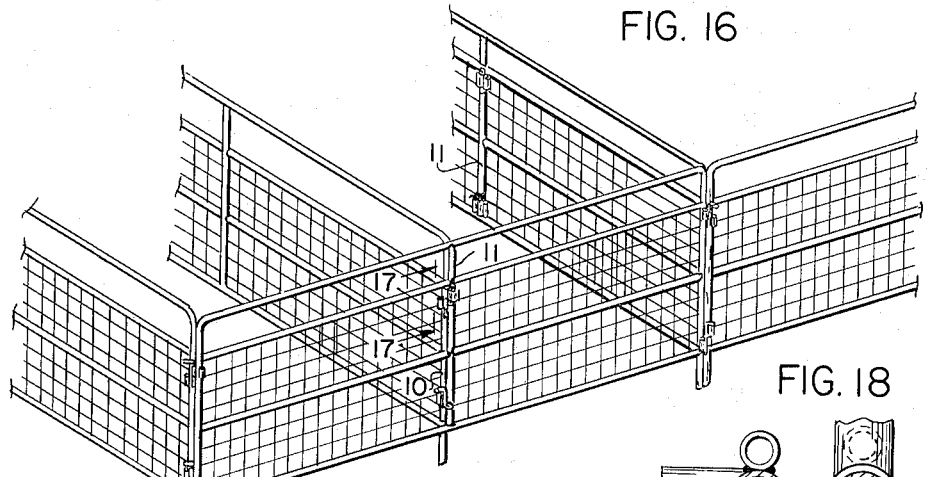
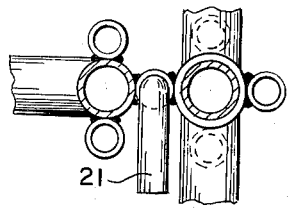
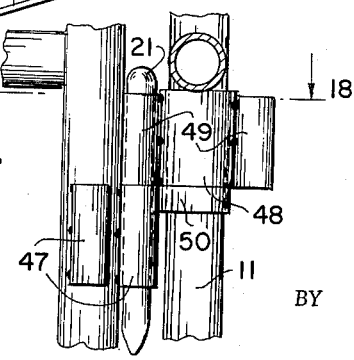
INVENTOR
IRA B. PARR
BRUCE PARR
BY
ATTORNEY

United States Patent Office 3,204,606
Patented Sept. 7, 1965

3,204,606
ARTICULATED LIVESTOCK PANELS
Ira B. Parr, Rte. 3, Box 105, Friona, Tex., and
Bruce Parr, Friona, Tex.
Filed Nov. 8, 1963, Ser. No. 322,301
11 Claims. (Cl. 119—20)

This invention relates to the care, feeding, and handling of livestock and to the equipment employed of sufficient strength and durability to provide positive retention of the same regardless of the variety of livestock with which the equipment is used.

The invention relates particularly to equipment designed and constructed for use as a corral or enclosure for the retention of livestock either on a temporary or prolonged basis and during activity or inactivity thereof, and in a manner that they can be clearly seen, easily fed, and the premises kept sanitary with minimum attention and effort.

Fences of various kinds have been provided for the retention of livestock of a more or less permanent nature including posts embedded in the earth with connecting structure, all of which was relatively heavy requiring substantial materials, labor and skill in the fabrication thereof, and which frequently were inadequate to retain certain of the animals placed therein, and such structures have lacked flexibility to be adjusted to areas of varying sizes and consequently imposed a substantial problem in the provision of adequate corral-forming fencing.

It is an object of the invention to provide at low cost a series of relatively simple portable prefabricated panels of strong durable construction, capable of being installed on a temporary or prolonged basis for retaining a variety of livestock regardless of whether relatively small or large, and in a manner that they may be clearly viewed or access had thereto, and which panels may readily be installed or erected by a minimum of unskilled workmen in a minimum of time and can readily and quickly be taken down or dismantled, transported to a new location and re-erected as easily as before.

Another object of the invention is to provide prefabricated panels, a series of which can be readily connected by pins and which will give each to the adjacent panel mutual support so that such panels will be self-sustaining without having posts buried in the earth, and with certain of said panels having gates with such panels adequately reinforced for efficient prolonged use in the retention of livestock.

A further object of the invention is to provide panels of the character indicated with connections or hinges allowing the joining of two to six panels by a simple hinge thereby providing substantially greater flexibility to the structure and making it possible to have multiple enclosures with posts supporting the ends of more than one or two panels.

Figure 5:
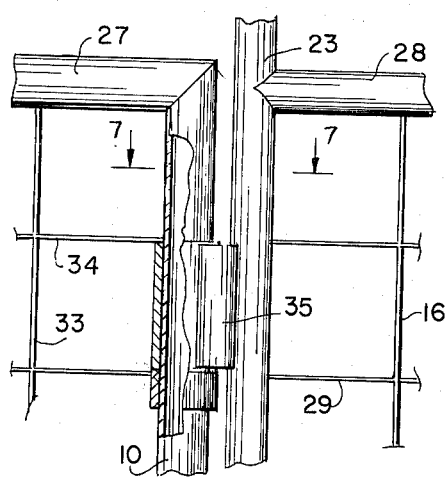
Figure 6:
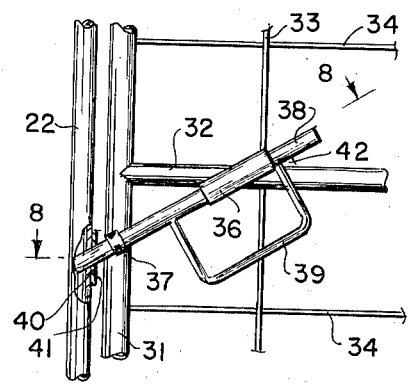
Figure 9:
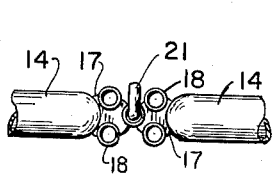
Figure 10:
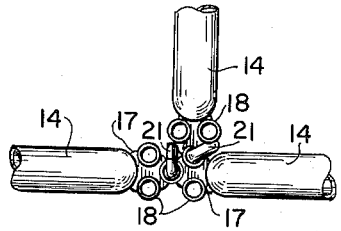
Figure 11:
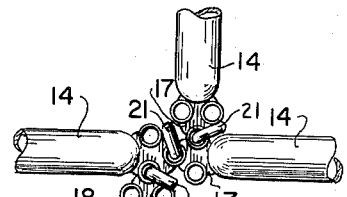
Figure 8:
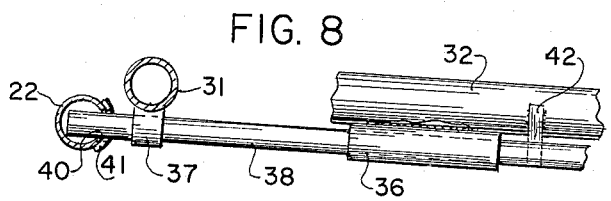

Other objects and advantages of the invention will be apparent from the following description taken in conjunction with the accompanying drawings in which:

FIG. 1 is a perspective illustrating a corral or fencing in accordance with the present invention;

FIG. 2, a planar view of multiple panels;

FIG. 3, an enlarged fragmentary perspective of the manner in which the panels are connected;

FIG. 4, a further enlargement showing one of the hinge members on the line 4—4 of FIG. 3;

FIG. 5, an enlarged fragmentary view of a portion broken away showing a gate hinge;

FIG. 6, an enlarged fragmentary illustrating the gate locking means;

FIG. 7, an enlarged fragmentary sectional view taken on lines 7—7 of FIG. 5;

FIG. 8, a fragmentary sectional view taken along lines 8—8 of FIG. 6;

FIG. 9, a fragmentary detail illustrating two panels secured together;

FIG. 10, a fragmentary detail illustrating three panels secured together;

FIG. 11, a fragmentary detail illustrating four panels secured together;

FIG. 12, a fragmentary detail perspective of a modified form of connector;

FIG. 13, a fragmentary perspective illustrating the use of the connector with a single hinge pin;

FIG. 14, a fragmentary perspective of a further modified form of the connector where short lengths of tubing are connected to the end post;

FIG. 15, a perspective of an auxiliary sleeve member used on the intermediate post of the panel;

FIG. 16, a fragmentary perspective of a series of panel members utilizing the embodiments of FIGS. 14 and 15;

FIG. 17, a vertical section on the line 17—17 of FIG. 16; and,

FIG. 18, a horizontal section on the line 18—18 of FIG. 17.

Briefly stated the invention is a series of relatively simple portable prefabricated panels, generally of rectangular configuration, capable of being easily installed with minimum labor in a minimum of time to provide a corral of desired size, located entirely above the surface of the earth, to accommodate a particular number of livestock and which can be varied in size by the addition or substraction of panels, the enclosure thus provided being readily movable or taken down, certain of the panels including gates and such panels being of reinforced construction to insure reliable temporary or prolonged use.

With continued reference to the drawings there are disclosed in the first two figures of the drawings panels which exemplify the invention and some of which panels have gates while others do not. The panels without gates include end posts 10 and intermediate posts 11 which may be of tubular or pipe construction.

The vertical posts 10 and 11 are connected by a series of parallelly spaced generally horizontal bars 13 and a top bar 14, such bars being welded to the posts and, if preferred, the top bar may be an integral continuation of the end posts 10. A panel of the character described containing the posts 10 and 11, the bar 14, and the series of bars 13 will be adequate to retain livestock of large size. In order to retain smaller livestock a series of horizontal and vertical members 15 and 16 may be added. These members may be of wire rod stock welded to the posts and horizontal members to provide mesh of any desired size, as for example, four inches by four inches in order to retain small farm animals or livestock.

The posts and horizontal members which constitute the skeleton or frame of the panels preferably are welded together in a manner to provide maximum strength. This is accomplished by cutting them at 45° angles in the same plane and spreading the contiguous parts slightly in fitting the pipes together making it difficult if not almost impossible to tell which pipe has been welded to the other.

The regular or gateless panels just described are provided with unique hinges by which they may be joined including a connector 17 and three generally parallel sleeves 18 welded thereto in upright position on and substantially parallel to the posts 10. The connector 17 is provided with recesses 19 of a curvature corresponding to the curvature of sleeve 18 to provide maximum solid contact when attached thereto, and the connector also is provided with a recess 20 to provide maximum contact with the end post 10 to which it is welded.

Each panel is provided with spaced hinges at each end for cooperation with corresponding hinges of an adjacent panel, and therefore the hinges at one end of the panel are at different elevations from those at the opposite end of the panel. For example, the hinges at one end of the panel are spaced further apart than the hinges at the opposite end of the panel so that the more closely spaced hinges may nest closely between those spaced further apart and when a pin 21 is inserted in aligned openings the raising and lowering of one panel will carry with it the end of the adjacent panel whereas if the hinges on one panel fitted above instead of on opposite sides of the hinge members on the other panel they could be readily separated by the lifting of one of the panels.

It will be apparent that the panels may be hooked together at any angle desired and other panels can be attached thus making it possible to have a series of panels with a maximum of six extending from each of the end posts 10. Also it is possible to provide any kind of pen or enclosure needed and to modify as the needs require with minimum effort without the requirement for any particular skill. The hinges are located on the panels so that there is a loose fit in order that there will be no difficulty in installing the panels on a surface which is not level.

A gate panel is provided composed of a pair of gate posts 22 and 23 having a connecting arch portion 24 across the top and a connecting base portion 25 across the bottom. For added strength the brace 26 may be added at the corners.

Beside the gateway frame formed by the posts 22 and 23 and the upper and lower connecting members 24 and 25 a short fence-forming panel section may be provided like that of the gateless panel in order that the panel having the gateway may be of a length corresponding to that of the gateless panel and to provide such a panel a post 10 may have its upper end connected to the post 23 by means of a bar 27 with a series of spaced generally horizontal bars 28 therebeneath connecting the panel post 10 with the gate post 23 and with grill work of wire rod stock including vertical members 16 and horizontal members 29. For increased strength a brace 30 may be added connecting the upper portion of the post 23 with the end portion of the bar 27.

In the structure just described the bar 24, which forms the top of the gate frame, is at an elevation above the top panel bars 14 and 27. If desired, instead of the top bar 24 being at a higher elevation the posts 22 and 23 may be made shorter as illustrated in FIG. 2 in which event the bar 24 over the gate opening will be at the same height of the adjoining panel section 27 and the top bars 14 of other panels.

The gate panel structure described includes a generally rectangular gate frame which like the gateless panel is of sturdy structure. A generally rectangular gate is provided having a marginal frame 31, one or more horizontal bars 32 parallel to the top and bottom portions of the marginal frame 31 and a mesh formed of wire or rod stock and including vertical members 33 and horizontal members 34. The gate is attached to the post 23 by means of hinges 35 and is provided with means for fastening it in closed position including aligned sleeves 36 and 37 (FIG. 6) in which is mounted a slidable latching bar 38, the sleeve 37 being attached to the upright portion of the gate frame 31 and the sleeve 36 being attached to the intermediate bar 32 of the gate, such attachment being preferably by welding.

Thus the latching bar 38 may move endwise in the sleeves 36 and 37 and a generally U-shaped handle 39 is provided for moving the bar 38 up the incline. The lower end of the latching bar 38 extends into a latch opening 40 in the post 22 which forms part of the frame of the gateway, and in addition to the latch opening 40 a latch plate 41 may be attached to the post 22. Thus the gate may be secured in closed position.

In order to devise additional lock securing means an outwardly projecting stop pin 42 (FIGS. 6 and 8) is fixed to the horizontal bar 32 in a manner that it will extend behind the U-shaped handle 39 when the gate is latched. In order to unlatch the gate it will be necessary to swing the U-shaped handle 39 approximately 90 degrees so it may pass the stop pin 42.

The hinges 35 are disposed at an angle forwardly of the gate frame and mount the gate slidably forwardly of the gate frame and the adjoining panel in order that the gate may be swung to a position substantially parallel to the adjoining panel when the gate is opened (FIG. 7). In FIG. 12 a slightly modified form of hinge member is disclosed including a curved attaching plate 43 which may be secured by welding or the like to one of the end posts and to this mounting plate is welded or otherwise secured a connector or hinge member 44 having openings 45, three of which are shown in equally spaced relation. The member 44 is a generally flat member which can be produced readily in any desired manner as, for example, by stamping from a plate.

Referring to FIG. 13, the posts 10 are provided with four of the hinge members of the type shown in FIG. 12, two on each post, and with the two on one of the end posts spaced above and below the two on the other end posts and with openings 45 in alignment which receive a hinge pin 46 with one turned over end.

In FIG. 16 a series of panels are fastened together by the hinge members of FIGS. 14 and 15. As illustrated in FIG. 14 the post 10 is provided with a structure somewhat similar to that of FIG. 12 except that instead of the mounting plate 43 and the plate 44, three sleeves 47 are welded or otherwise secured directly to the post 10 in equally spaced relation, such connection joining the ends of two panels regardless of the angle between them.

In FIG. 15 is illustrated a connector or hinge member which can be applied to the intermediate post 11, as in FIG. 16, to enable the end of a panel to be attached thereto for subdividing or making smaller enclosures. This auxiliary hinge comprises a sleeve 48 and two smaller sleeves 49 connected in opposite relation to the sleeve 48 by welding or in another suitable manner. The intermediate post 11 may have a collar 50 (FIG. 17) attached thereto by welding or in any other desired manner in order to maintain the sleeve 48 at proper elevation.

It will be apparent from the foregoing that a series of panels are provided including with and without gates, which panels may be readily assembled by unskilled persons with minimum effort in a minimum of time to provide an enclosure or corral which will retain small, large and strong livestock, such panel structure being of relatively light weight, sturdy, durable and high flexible as to the area enclosed It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. A panel for combination with other panels of related character to provide an enclosure for the retention of livestock, said panel comprising spaced posts and bars connecting said posts and providing a frame, cross rods carried by said frame and providing a barrier for large and small animals, means for connecting said panel to other panels including hinge members attached to said posts, each hinge member comprising connector means having multiple spaced sleeve-like openings therein generally parallel to said posts, said openings each being selectively alignable with a corresponding opening in a hinge member of another panel, the hinge members on the post at one end of the panel being longitudinally spaced apart to cooperatively receive therebetween the connector means of the hinge members at an adjacent end of another panel, a hinge pin for insertion through aligned openings of both pairs of hinge members to interlock the panels together so that when either of the connecting panels is raised the other panel likewise will be raised whereby multiple panels may be connected to form enclosure provided of easily separable connected parts, one of said panels having a frame including a portion defining a gateway, a gate in said frame portion movable between open and closed positions, means mounting one end of said gate slightly forwardly of said frame so that it can be fully opened, latch means for fastening said gate in closed position and including an operating handle, and a latch retaining member mounted on said gate in a position to extend behind said handle for preventing accidental release of said latch but allowing clearance thereof by partial rotation of said handle.

2. A portable unitary fence panel for combination with other panels of similar character to provide a self-sustaining enclosure for the retention of livestock, said panel comprising posts including end posts, bars connecting said posts and providing a generally rectangular frame, cross rods carried by said frame and providing a barrier therethrough for large and small animals, means whereby said panel can be quickly detachably connected to other panels, said means including hinge members attached to said posts, each hinge member having multiple generally parallel elongated openings having axes substantially parallel to said posts so that one can be substantially aligned with a similar opening in the hinge member of another panel, the hinge members on the post at one end of the panel being spaced apart enough to cooperatively and interlockingly receive therebetween the hinge members at the adjacent end of another panel, hinge pin means for insertion through both pairs of hinges so that when either of the connected panels is raised the other panel likewise will be raised whereby when multiple panels are connected together a portable enclosure of unitary construction is provided.

3. A panel of the character specified in claim 2 including a post intermediate said end posts, and vertically spaced hinge members on said intermediate post, each of said vertically spaced hinge members comprising a plurality of co-extensive tubular portions disposed substantially parallel thereto and located in a manner for vertical interlocking cooperation with hinge members on another panel, and pin means for pivotally connecting said hinge members together whereby restricted areas of smaller size can be provided.

4. A panel of the character specified in claim 2 including vertically spaced multi-passaged hinge members on an intermediate portion of said panel positioned at an angle to and parallel to the plane of the panel for connective cooperation with multi-passaged hinge members on the end of another panel to provide for areas of smaller size.

5. Unitary fence panel construction for defining a restricted area for the retention of livestock, said panel construction comprising parallel multiple posts and upper and lower marginal connecting bars to form a generally rectangular frame and a series of cross rods mounted in said frame and providing a barrier against movement of small and large animals therethrough, hinge members integrally and spacially attached to said posts, each hinge member having multiple generally parallel spaced elongated openings with the axes thereof disposed substantially parallel to the axes of said posts so that one of said multiple openings can be selectively aligned with an opening of a hinge member of another panel whereby multiple panels may be connected to provide a portable enclosure, said frame defining a gateway panel portion, a gate for said gate in said gateway slightly forward of the plane of said frame to allow full opening of said gate, and latch means for fastening said gate in closed position.

6. Multiple panel construction for defining a self-sustaining enclosure to form a restricted area for the retention of livestock and including a panel comprising parallel end posts and upper and lower substantially parallel connecting bars integrally connected with said end posts to form a marginal frame and a series of cross rods in said marginal frame providing a barrier for small and large animals, hinge members attached to each of said end posts, each hinge member including multiple generally parallel and co-extensive sleeves located on such end posts with the axes of said sleeves parallel to the longitudinal axes of said posts so that each of said sleeves can be aligned with a corresponding hinge sleeve on another panel, and multiple panels correspondingly connected together to provide an enclosure.

7. Self-sustaining fence panel construction including panel members defining a restricted area for the retention of livestock therein, each of said panel members comprising a barrier-forming structure of predetermined height and length and including spaced substantially parallel posts, hinge members on and spaced longitudinally of said posts, each of said hinge members including a connector element, a plurality of tubular passageways in said connector element co-extensive in length and disposed substantially parallel to the longitudinal axis of said posts, removable pin means for selective use with said tubular passageways in said hinge members, said hinge members on each of said posts being longitudinally spaced therealong to cooperatively and interlockingly receive the corresponding hinge members of the end of another panel therebetween whereby when said removable pin means is engaged in selective passageways of said hinge members the lifting of one of said hinge-connected panels will lift the other panel.

8. A self-sustaining multi-panel enclosure construction defining a restricted area for the retention of livestock therein, said enclosure construction comprising a barrier-forming structure of interconnected unitary panels each of predetermined length and breadth and having parallel end members vertically extending pin-type hinge members including a plurality of laterally spaced pin-receiving tubular apertured members therein rigidly mounted on and extending outwardly from said parallel end members and differentially spaced apart whereby the spacing of the remote outer edges of said hinge members at one end of each panel corresponds substantially to the spacing of the inner facing end edges of the hinge members at the other end of said given panel, said spacing of said hinge members providing for a cooperative nested relationship between pairs of complementary hinge members on adjacent panels, and pin means for selectively interengaging said plurality of pin-receiving members of said pairs of complementary hinge members to connect said panels together, said plurality of pin-receiving apertures enabling other panels to be connected simultaneously to said hinge members.

9. Panel construction defining a restricted area for the retention of livestock, said panel construction comprising a barrier-forming panel structure of predetermined length and breadth and having substantially parallel ends, spaced hinge members differentially and rigidly positioned on opposite ends of said panel with the top and bottom of the respective hinge members at one end thereof being located at elevations substantially corresponding respectively to the bottom and top of the respective hinge members at the other end of the panel so that complementary and cooperative hinge members on adjacent panels may be aligned and interlocked against relative vertical endwise movement when two of said panels are connected, each of said hinge members comprising a connector member having a plurality of spaced arcuate surfaces thereon, the axes of said arcuate surfaces being in substantial alignment with the parallel ends of said panel, a plurality of sleeves of co-extensive length rigidly secured to said arcuate surfaces in parallel relation to the adjacent end of said panel, and connecting pin means for selective engagement with said sleeves for pivotally effecting said connection between said complementary and cooperative hinge members whereby multiple panels may be joined together at either end of said panel member.

10. Planar panel construction for selectively defining a restrictive area, said panel construction comprising a frame for mounting in a plane normal to the ground surface having parallel end members, a plurality of spaced hinge members fixed to each said parallel end member, the hinge members on one end of said panel being spaced apart a predetermined greater distance than the hinge members on the other end of said panel whereby when a pair of said panels are positioned for connection together the hinge members of one panel are received in abutting nesting relation between the hinge members of the other panel, each hinge member including a connector rigidly fixed to said end member, a series of spaced generally co-extensive parallel transversely spaced sleeves attached to said connector, at least one of said sleeves being generally in alignment with the plane of said panel and spaced from said end member, each of said sleeves being selectively alignable with a sleeve in the connector of an adjacent panel hinge member, a relatively easily removable pivotal hinge pin for insertion through said aligned sleeves, whereby one or a plurality of panels can be readily connected to said spaced hinge members at one end of one panel.

11. Panel construction for selectively defining a restrictive area, each panel comprising a frame, at least one hinge member fixed to each end of said frame, each hinge member including a connector fixed to said frame, said connector having a series of horizontally spaced generally parallel elongated openings, at least one of said openings being generally in alignment with said frame, the opening in one connector being selectively alignable with an opening in the connector of an adjacent panel, a hinge pin receivable within said aligned openings, whereby one or a plurality of panels can be concurrently connected to the same hinge member at one end of one panel.

References Cited by the Examiner

UNITED STATES PATENTS

| | | | |
|---|---|---|---|
| 1,128,769 | 2/15 | Ferris et al. | 119—148 |
| 1,348,343 | 8/20 | Zimmerman | 119—20 |
| 2,581,318 | 1/52 | Bartlett | 119—20 |
| 2,678,629 | 5/54 | Meyer | 119—20 |
| 2,736,041 | 2/56 | Maloof | 119—20 XR |
| 3,105,462 | 10/63 | Miller | 119—20 |

SAMUEL KOREN, *Primary Examiner.*

ALDRICH F. MEDBERY, *Examiner.*